H. SAUCKE.
PACKING RING.
APPLICATION FILED NOV. 28, 1919.
1,364,814.
Patented Jan. 4, 1921.
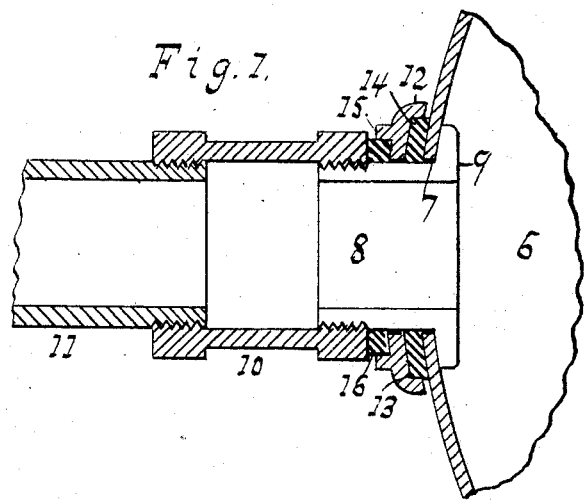
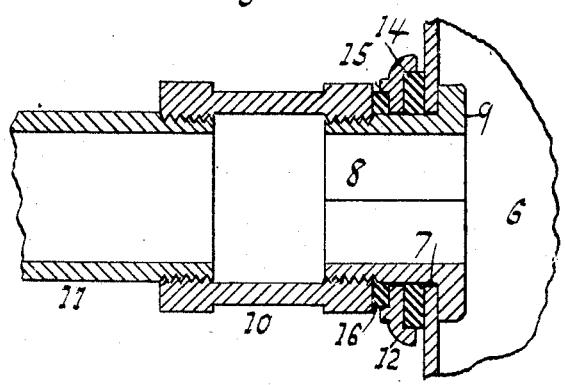
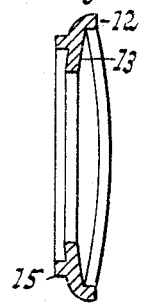 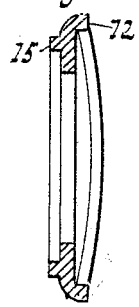 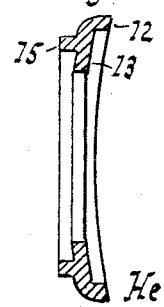
INVENTOR
*Herman Saucke*
BY
ATTORNEYS

UNITED STATES PATENT OFFICE.

HERMAN SAUCKE, OF NEW YORK, N. Y.

PACKING-RING.

1,364,814. Specification of Letters Patent. Patented Jan. 4, 1921.

Application filed November 28, 1919. Serial No. 341,041.

*To all whom it may concern:*

Be it known that I, HERMAN SAUCKE, a citizen of the United States, residing at New York, in the county of Bronx and State of New York, have invented new and useful Improvements in Packing-Rings, of which the following is a specification.

This invention relates to a packing ring which is essentially adapted for making a water tight joint between a nipple projecting from an orifice in a receptacle, and a coupling for locking the nipple to the receptacle.

The object of the invention is to provide the packing ring with a flexible chamfer or countersink for seating a gasket so that, when pressure is exerted on the chamfer it will shape itself to conform to the peripheral and longitudinal surface of the receptacle.

The invention also includes a recess situated on the reverse side of the chamfer for supporting a second gasket which in conjunction with the first named gasket renders an air and water tight closure at the most susceptible place about the orifice where a leak is liable to occur.

Another object of the invention is to concave the packing ring horizontally so that it will effectively fit the convex surface of the receptacle.

The invention resides more particularly in the novel combinations hereinafter described and claimed, reference being made to the accompanying drawing in which:

Figure 1 represents a horizontal section showing the packing ring applied to a receptacle.

Fig. 2 is a vertical section of the same.

Fig. 3 is a vertical section of the packing ring before it is connected to the receptacle.

Fig. 4 is a similar section showing the ring after it was connected to the receptacle.

Fig. 5 is a horizontal section of the same.

In the drawing the numeral 6 designates a section of a boiler which is adapted to contain hot water or any other fluid under pressure. The boiler is provided with an orifice 7, reamed in the shell, and in this orifice is inserted a nipple 8 having a flange 9 to engage the inner surface of the shell. The nipple is preferably made in two sections so that it can be inserted from the outer side of the shell. A threaded coupling 10 engages the projecting end of the nipple, and a pipe 11 to conduct the liquid or fluid to or from the boiler is screwed in the other end of the coupling.

On the stem of the nipple between the shell and coupling is loosely mounted a packing ring having a marginal rim 12 and a chamfered or countersink portion 13 extending from the rim toward the axis of the ring. The chamfer as shown in Fig. 1 is concentric with the circumferential portion of the shell adjacent to the orifice. A gasket 14 preferably made of compressed paper or fiber is arranged in the annular space between the chamfer and the surface of the shell surounding the orifice.

An annular flange 15 projects from the face of the ring. This flange forms the rim of a recess, for seating a gasket 16 of smaller diameter than the opposite gasket. The coupling when screwed upon the nipple impinges onto the side of the gasket and compresses it into the recess to serve as an auxiliary to stop any leak that escapes or evades the other gasket.

The ring is horizontally concaved or dished as indicated in Fig. 5 so that it will be of suitable shape to closely fit to the transverse contour of the boiler about the orifice. When the coupling is screwed against the gasket 16 it moves the ring toward the shell, thus compressing the gasket 14 and jamming it against the exterior of the shell to substantially seal any leakage between the orifice and the coupling. The pressure transmitted to the gasket 16 tends to move the chamfer toward the shell to practically bring it parallel with the vertical wall of the shell, as indicated in Fig. 2.

It will be readily understood, that in view of the peculiar formation of the chamfer in connection with the shell, the entire gasket will tightly adhere to the shell, consequently creating a strong suction and sealing the joint by atmospheric pressure. In this construction the rims on the ring by covering the periphery of the gaskets prevent them from spreading and give a finished or neat appearance to the device. The greatest pressure by the coupling is toward the centers or axes of the gaskets crowding them onto the stem of the nipple.

I claim:

1. A metallic packing ring having a chamfered portion for seating a gasket, and means pressing the chamfer to make it conform to the surface of a shell.

2. A metallic packing ring having an annular flexible self-forming chamfered portion for seating a gasket, and means pressing the chamfer to make it conform to the surface of a shell 3. A metallic packing ring having a flexible chamfered member, and a recess provided with a gasket pressing on the reverse side of the chamfer to make it conform to the surface of a shell.

4. A packing ring having a marginal rim, an annular chamfered portion extending from the rim to the axis for seating a gasket, said ring being concaved to fit a convex vessel.

5. A packing ring having a marginal rim, an annular chamfered portion extending from the rim to the axis for seating a gasket, said rim being concaved to transversely fit the exterior of a cylindrical vessel, and a recess opposite the chamfer to support a second gasket.

6. A packing ring having a marginal rim, an annular chamfered portion extending from the rim to the axis for seating a gasket, said rim being concaved to transversely fit the exterior of a cylindrical vessel, and a recess located in front of the chamfer having a marginal rim to support a second gasket.

In testimony whereof I have hereunto set my hand in the presence of two subscribing witnesses.

HERMAN SAUCKE.

Witnesses:
SAMUEL LEWIS,
WILLIAM MILLER.